United States Patent
Li et al.

(10) Patent No.: US 11,430,124 B2
(45) Date of Patent: Aug. 30, 2022

(54) VISUAL OBJECT INSTANCE SEGMENTATION USING FOREGROUND-SPECIALIZED MODEL IMITATION

(71) Applicant: Samsung Electronics Co., Ltd., Suwon-si (KR)

(72) Inventors: Dawei Li, San Jose, CA (US); Wenbo Li, Santa Clara, CA (US); Hongxia Jin, San Jose, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 135 days.

(21) Appl. No.: 16/946,504

(22) Filed: Jun. 24, 2020

(65) Prior Publication Data

US 2021/0407090 A1 Dec. 30, 2021

(51) Int. Cl.
*G06K 9/00* (2022.01)
*G06T 7/10* (2017.01)
(Continued)

(52) U.S. Cl.
CPC .............. *G06T 7/10* (2017.01); *G06K 9/6267* (2013.01); *G06N 3/0454* (2013.01); *G06T 2207/20081* (2013.01); *G06T 2207/20084* (2013.01)

(58) Field of Classification Search
CPC ...... G06N 3/0454; G06N 20/00; G06N 3/084; G06N 3/082; G06N 3/0481; G06N 3/08; G06N 5/02; G06N 3/04; G06N 3/088; G06N 3/0472; G06K 9/6267; G06K 9/6256; G06K 9/6274; G06K 2209/21; G06K 9/00067; G06K 9/00201; G06K 9/00268;
(Continued)

(56) References Cited

U.S. PATENT DOCUMENTS 11,030,528 B1* 6/2021 Zhuo .................... G06K 9/4623
2015/0356461 A1 12/2015 Vinyals et al.
(Continued)

FOREIGN PATENT DOCUMENTS

CN 110163344 * 8/2019
WO 2019/240964 A1 12/2019

OTHER PUBLICATIONS

Bolya et al., "YOLACT: Real-time Instance Segmentation," Proceedings of the IEEE International Conference on Computer Vision, 2019, pp. 9157-9166.
(Continued)

*Primary Examiner* — Quan M Hua

(57) ABSTRACT

A method includes training, using at least one processor, a specialized teacher model to perform visual object instance segmentation in order to segment and classify objects in first training images. The first training images contain foreground objects without backgrounds. The method also includes training, using the at least one processor, a student model to perform visual object instance segmentation in order to segment and classify objects in second training images. The second training images contain the foreground objects and the backgrounds. Training the student model includes using selected outputs of the specialized teacher model. The method further includes deploying the trained student model to perform visual object instance segmentation in an external device.

20 Claims, 6 Drawing Sheets

(51) Int. Cl.
*G06N 3/04* (2006.01)
*G06K 9/62* (2022.01)

(58) Field of Classification Search
CPC ............. G06K 9/00288; G06K 9/0063; G06K 9/00684; G06K 9/34; G06K 9/4628; G06K 9/62; G06K 9/6201; G06K 9/6217; G06K 9/6263; G06K 9/6264; G06K 9/629; G06K 9/66; G06K 2209/23; G06K 9/4604; G06K 9/6218; G06K 9/6268; G06K 9/6277; G06T 2207/20081; G06T 2207/20084; G06T 7/194; G06T 2207/10004; G06T 7/11; G06T 7/136; G06T 7/0002; G06T 7/10
See application file for complete search history.

(56) References Cited

U.S. PATENT DOCUMENTS

| | | | |
|---|---|---|---|
| 2017/0083829 A1 | 3/2017 | Kang et al. | |
| 2017/0132528 A1* | 5/2017 | Aslan | G06N 20/00 |
| 2018/0046914 A1 | 2/2018 | Li et al. | |
| 2018/0158552 A1* | 6/2018 | Liu | G16H 50/70 |
| 2018/0268292 A1 | 9/2018 | Choi et al. | |
| 2018/0330737 A1* | 11/2018 | Paulik | G10L 15/30 |

OTHER PUBLICATIONS

Chen et al., "Learning Efficient Object Detection Models with Knowledge Distillation," 31st Conference on Neural Information Processing Systems, 2017, pp. 742-751.
Chen et al., "Rethinking Atrous Convolution for Semantic Image Segmentation," https://arxiv.org/abs/1706.05587, 2017, 14 pages.
Chen et al., "Attention-based Autism Spectrum Disorder Screening with Privileged Modality," Proceedings of the IEEE International Conference on Computer Vision, 2019, pp. 1181-1190.
Cho et al., "On the Efficacy of Knowledge Distillation," Proceedings of the IEEE International Conference on Computer Vision, 2019, pp. 4794-4802.
Everingham et al., "The PASCAL Visual Object Classes Challenge—a Retrospective," International Journal of Computer Vision 111(1), 2015, pp. 98-136.
Garcia et al., "Modality Distillation with Multiple Stream Networks for Action Recognition," Proceedings of the European Conference on Computer Vision, 2018, pp. 103-118.
Han et al., "ESE: Efficient Speech Recognition Engine with Sparse LSTM on FPGA," Proceedings of the 2017 ACM/SIGDA International Symposium on Field Programmable Gate Arrays, 2017, pp. 75-84.
Han et al., "Deep Compression: Compressing Deep Neural Networks with Pruning, Trained Quantization and Huffman Coding," https://arxiv.org/abs/1510.00149, 2015, 14 pages.
He et al., "Mask R-CNN," Proceedings of the IEEE International Conference on Computer Vision, 2017, pp. 2961-2969.
He et al., "Filter Pruning via Geometric Median for Deep Convolutional Neural Networks Acceleration," Proceedings of the IEEE Conference on Computer Vision and Pattern Recognition, 2019, pp. 4340-4349.
Hinton et al., "Distilling the Knowledge in a Neural Network," https://arxiv.org/abs/1503.02531, 2015, 9 pages.
Howard et al., "Searching for MobileNetV3," Proceedings of the IEEE International Conference on Computer Vision, 2019, pp. 1314-1324.
Howard et al., "MobileNets: Efficient Convolutional Neural Networks for Mobile Vision Applications," https://arxiv.org/abs/1704.04861, 2017, 9 pages.
Hu et al., "Squeeze-and-Excitation Networks," Proceedings of the IEEE Conference on Computer Vision and Pattern Recognition, 2018, pp. 7132-7141.
Iandola et al., "SqueezeNet: AlexNet-level accuracy with 50x fewer parameters and <0.5MB model size," https://arxiv.org/abs/1602.07360, 2016, 9 pages.
Jacob et al., "Quantization and Training of Neural Networks for Efficient Integer-Arithmetic-Only Inference," Proceedings of the IEEE Conference on Computer Vision and Pattern Recognition, 2018, pp. 2704-2713.
Kim et al., "Compression of Deep Convolutional Neural Networks for Fast and Low Power Mobile Applications," https://arxiv.org/abs/1511.06530, 2015, 16 pages.
Kim et al., "Sequence-Level Knowledge Distillation," Proceedings of the 2016 Conference on Empirical Methods in Natural Language Processing, 2016, pp. 1317-1327.
Lambert et al., "Deep Learning under Privileged Information Using Heteroscedastic Dropout," Proceedings of the IEEE Conference on Computer Vision and Pattern Recognition, 2018, pp. 8886-8895.
Lee et al., "SPIGAN: Privileged Adversarial Learning from Simulation," https://arxiv.org/abs/1810.03756, 2018, 14 pages.
Lin et al., "Feature Pyramid Networks for Object Detection," Proceedings of the IEEE Conference on Computer Vision and Pattern Recognition, 2017, pp. 2117-2125.
Lin et al., "Focal Loss for Dense Object Detection," Proceedings of the IEEE International Conference on Computer Mision, 2017, pp. 2980-2988.
Lin et al., "Microsoft COCO: Common Objects in Context," European Conference on Computer Vision, 2014, pp. 740-755.
Liu et al., "SSD: Single Shot MultiBox Detector," European Conference on Computer Vision, 2016, pp. 21-37.
Liu et al., "Structured Knowledge Distillation for Semantic Segmentation," Proceedings of the IEEE Conference on Computer Vision and Pattern Recognition, 2019, pp. 2604-2613.
Lou et al., "AutoQ: Automated Kernel-Wise Neural Network Quantization," https://arxiv.org/abs/1902.05690, 2019, 11 pages.
Luo et al., "Graph Distillation for Action Detection with Privileged Modalities," Proceedings of the European Conference on Computer Vision, 2018, pp. 166-183.
Rastegar et al., "XNOR-Net: ImageNet Classification Using Binary Convolutional Neural Networks," European Conference on Computer Vision, 2016, pp. 525-542.
Redmon et al., "You Only Look Once: Unified, Real-Time Object Detection," Proceedings of the IEEE Conference on Computer Vision and Pattern Recognition, 2016, pp. 779-788.
Ren et al., "Faster R-CNN: Towards Real-Time Object Detection with Region Proposal Networks," Advances in Neural Information Processing Systems, 2015, pp. 91-99.
Ronneberger et al., "U-Net: Convolutional Networks for Biomedical Image Segmentation," International Conference on Medical Image Computing and Computer-Assisted Intervention, 2015, pp. 234-241.
Tan et al., "MnasNet: Platform-Aware Neural Architecture Search for Mobile," Proceedings of the IEEE Conference on Computer Vision and Pattern Recognition, 2019, 9 pages.
Vapnik et al., "Learning Using Privileged Information: Similarity Control and Knowledge Transfer," Journal of Machine Learning Research 16, 2015, pp. 2023-2049.
Wang et al., "Distilling Object Detectors with Fine-grained Feature Imitation," Proceedings of the IEEE Conference on Computer Vision and Pattern Recognition, 2019, pp. 4933-4942.
Xie et al., "PolarMask: Single Shot Instance Segmentation with Polar Representation," https://arxiv.org/abs/1909.13226, 2019, 12 pages.
Zhang et al., "ShuffleNet: An Extremely Efficient Convolutional Neural Network for Mobile Devices," Proceedings of the IEEE Conference on Computer Vision and Pattern Recognition, 2018, pp. 6848-6856.
Croitoru et al., "Unsupervised learning from video to detect foreground objects in single images", 2017 IEEE International Conference on Computer Vision (ICCV), Mar. 2017, 9 pages.
Croitoru et al., "Unsupervised Learning of Foreground Object Segmentation", International Journal of Computer Vision, May 2019, 24 pages.

(56) References Cited

OTHER PUBLICATIONS

International Search Report and Written Opinion of the International Searching Authority dated Apr. 26, 2021 in connection with International Patent Application No. PCT/KR2021/000219, 9 pages.

* cited by examiner

VISUAL OBJECT INSTANCE SEGMENTATION USING FOREGROUND-SPECIALIZED MODEL IMITATION

TECHNICAL FIELD

This disclosure relates generally to imaging systems. More specifically, this disclosure relates to visual object instance segmentation using foreground-specialized model imitation.

BACKGROUND

Visual object instance segmentation refers to the task of detecting and delineating each distinct object of interest in an image. The end result of visual object instance segmentation typically includes a label for each specific object of interest, such as a label identifying whether the object is a person, a specific type of animal, or a specific type of inanimate object. The end result of visual object instance segmentation also typically includes an identification of the boundary of each specific object of interest at the detailed pixel level within the image. This is different from object localization that generally attempts to identify a bounding box around each object of interest, where each bounding box includes the associated object but does not represent the actual boundary of the associated object in the image. Various applications may rely on or benefit from some form of visual object instance segmentation, but visual object instance segmentation is a challenging computer vision task.

SUMMARY

This disclosure provides visual object instance segmentation using foreground-specialized model imitation.

In a first embodiment, a method includes training, using at least one processor, a specialized teacher model to perform visual object instance segmentation in order to segment and classify objects in first training images. The first training images contain foreground objects without backgrounds. The method also includes training, using the at least one processor, a student model to perform visual object instance segmentation in order to segment and classify objects in second training images. The second training images contain the foreground objects and the backgrounds. Training the student model includes using selected outputs of the specialized teacher model. The method further includes deploying the trained student model to perform visual object instance segmentation in an external device.

In a second embodiment, an electronic device includes at least one processor configured to train a specialized teacher model to perform visual object instance segmentation in order to segment and classify objects in first training images. The first training images contain foreground objects without backgrounds. The at least one processor is also configured to train, using selected outputs of the specialized teacher model, a student model to perform visual object instance segmentation in order to segment and classify objects in second training images. The second training images contain the foreground objects and the backgrounds. The at least one processor is further configured to deploy the trained student model to perform visual object instance segmentation in an external device.

In a third embodiment, a non-transitory computer readable medium contains instructions that when executed cause at least one processor to train a specialized teacher model to perform visual object instance segmentation in order to segment and classify objects in first training images. The first training images contain foreground objects without backgrounds. The medium also contains instructions that when executed cause the at least one processor to train, using selected outputs of the specialized teacher model, a student model to perform visual object instance segmentation in order to segment and classify objects in second training images. The second training images contain the foreground objects and the backgrounds. The medium further contains instructions that when executed cause the at least one processor to deploy the trained student model to perform visual object instance segmentation in an external device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
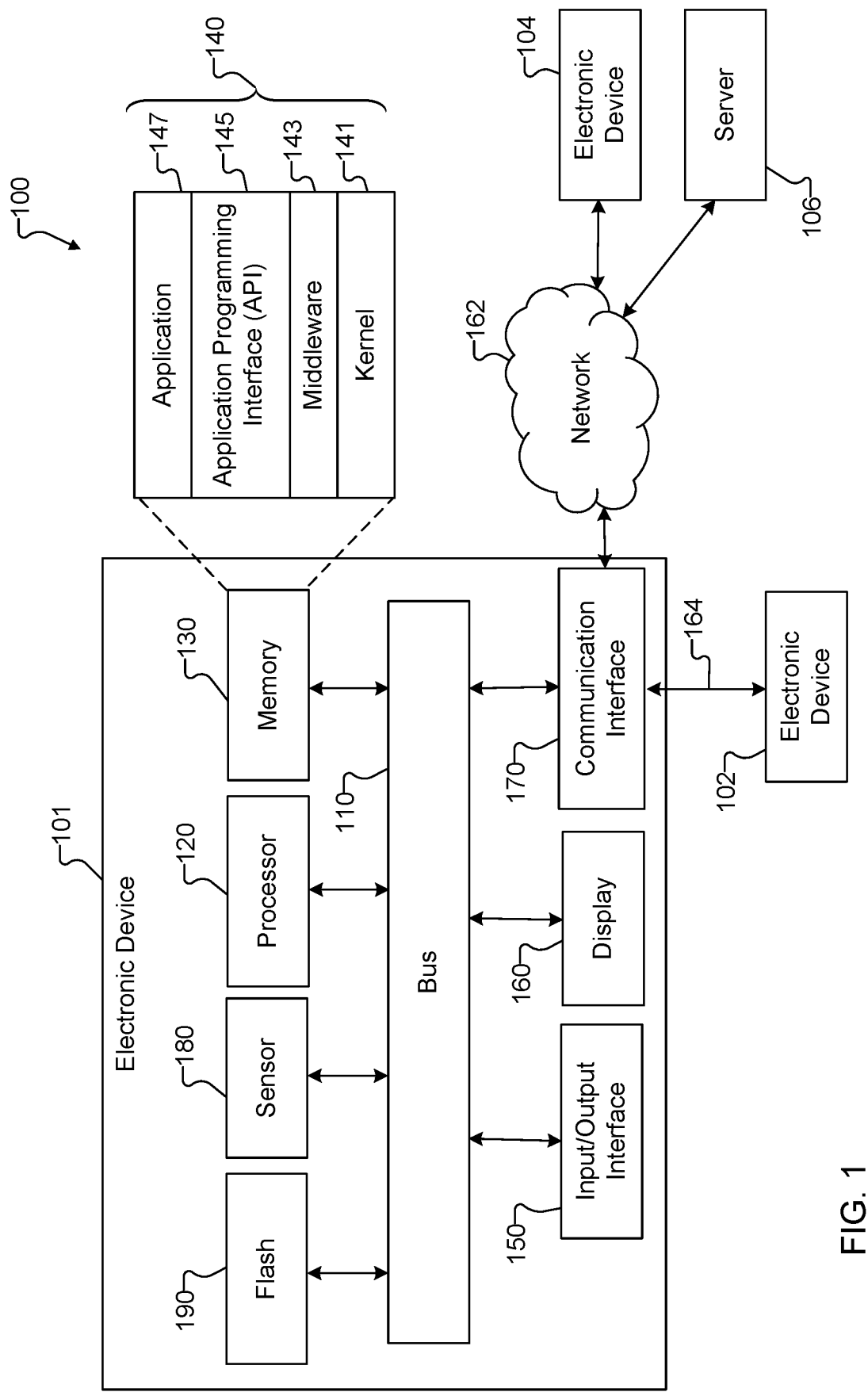
FIG. 1 illustrates an example network configuration including an electronic device in accordance with this disclosure.

FIGS. 1 through 12, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, visual object instance segmentation typically identifies a label for each specific object of interest in an image and the boundary of each specific object of interest at the detailed pixel level within the image. While useful in a number of applications, visual object instance segmentation is a challenging computer vision task. For example, due to the complexity of the visual object instance segmentation task, high-accuracy visual object instance segmentation algorithms often rely on large and complicated deep neural networks. As a result, these approaches typically cannot be used on mobile or edge devices, which are often constrained both in terms of processing power and memory. While it may be possible to create and train smaller neural networks for mobile or edge devices, the model accuracy of these smaller neural networks can be highly impacted, which prevents visual object instance segmentation from being performed accurately on those devices.

This disclosure provides various techniques for training a specialized machine learning teacher model that can perform visual object instance segmentation and then training a machine learning student model based on the knowledge of the specialized teacher model. Essentially, the specialized teacher model is trained to perform visual object instance segmentation in a highly-accurate manner, and the student model is trained to imitate the specialized teacher model in order to obtain high accuracy, as well. As described in more detail below, the specialized teacher model can be trained using transformed input images in which backgrounds have been removed from input images. By removing the backgrounds from the input images, the specialized teacher model is trained to focus primarily on classifying foreground objects and on identifying object boundaries when multiple objects overlap, so the specialized teacher model's classification accuracy is much higher compared to models trained with complete images. Also as described below, the model size/capacity (such as the number of neural network layers) of the specialized teacher model can match the size/capacity of the student model. Thus, for example, if the student model will be deployed on a mobile or edge device where smaller models may be preferable, the specialized teacher model can have an equally-small or similar size as the student model. If the student model will be deployed on a server or other high-power device where larger models are acceptable, the specialized teacher model can have an equally-large size or similar size as the student model. Since the specialized teacher model has the same or similar capacity as the student model, the imitation of the specialized teacher model by the student model can be more effective. This also makes the overall training process more resource-efficient in terms of processing power, memory cost, and training time.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, a sensor 180, and a flash 190. In some embodiments, the electronic device 101 may exclude at least one of these components or may add at least one other component. The bus 110 includes a circuit for connecting the components 120-190 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain at least one trained student model and use the trained student model(s) to perform visual object instance segmentation for one or more images captured by the electronic device 101.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain one or more trained student models and use the trained student model(s) to perform visual object instance segmentation. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101. The one or more cameras or other imaging sensors 180 can optionally be used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-190 as the electronic device 101 (or a suitable subset thereof). The server 106 can support to drive the electronic device 101 by performing at least one of operations (or functions) implemented on the electronic device 101 or by performing operations supporting the electronic device 101. For example, the server 106 can include a processing module or processor(s) that may support the processor 120 implemented in the electronic device 101. In some embodiments, the server 106 may execute one or more applications that, among other things, train at least one specialized teacher model for performing visual object instance segmentation, train at least one student model for performing visual object instance segmentation based on imitating the at least one specialized teacher model, and deploy the at least one student model to one or more external devices (such as the electronic device 101) for use.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
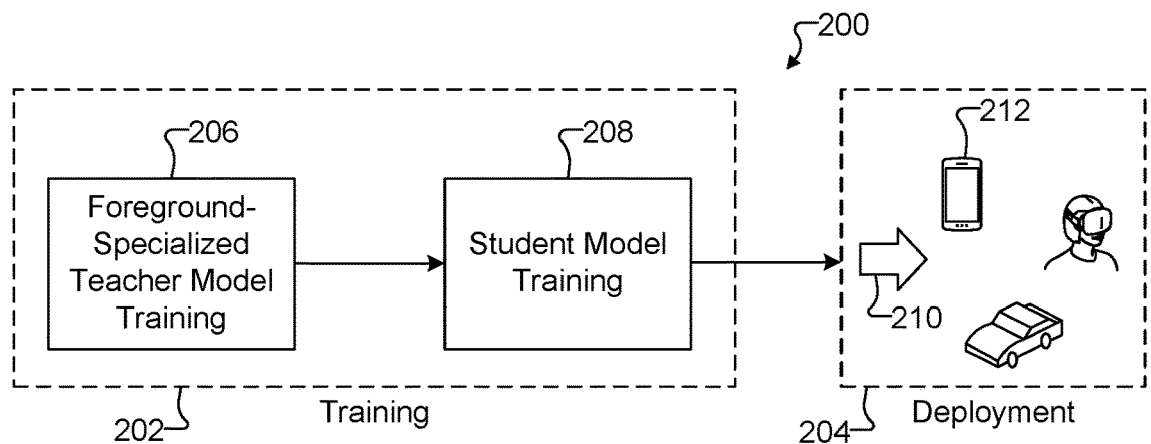
FIG. 2 illustrates an example technique for supporting visual object instance segmentation using foreground-specialized model imitation in accordance with this disclosure.

FIG. 2 illustrates an example technique 200 for supporting visual object instance segmentation using foreground-specialized model imitation in accordance with this disclosure. For ease of explanation, the technique 200 shown in FIG. 2 may be described as involving the use of the server 106 and the electronic device 101 in the network configuration 100 of FIG. 1. However, the technique 200 may involve the use of any suitable devices in any suitable systems.

As shown in FIG. 2, the technique 200 is generally divided into a training stage 202 and a deployment stage 204. The training stage 202 generally involves operations that are used to train a specialized teacher model and a student model for visual object instance segmentation, and the deployment stage 204 generally involves operations that are used to deploy the student model. Note that while a single specialized teacher model and a single student model may be described below in relation to FIG. 2, the training stage 202 may be used to train and the deployment stage 204 may be used to deploy any suitable number of specialized teacher models and any suitable number of student models.

As shown here, the training stage 202 includes a first training operation 206 and a second training operation 208. The first training operation 206 is used to train a foreground-specialized teacher model, which refers to a machine learning model that has been trained to perform visual object instance segmentation using training images in which the image backgrounds have been removed. As noted above, removing the backgrounds from the training images helps to train the foreground-specialized teacher model to focus on classifying isolated foreground objects in the training images, meaning the foreground-specialized teacher model can be trained to achieve very high accuracy when performing visual object instance segmentation. The foreground-specialized teacher model may represent any suitable machine learning model that can be trained to detect and delineate objects in images, such as a collection of neural network layers. The first training operation 206 can use any suitable technique to train the foreground-specialized teacher model.

The second training operation 208 is used to train a student model based on outputs of the foreground-specialized teacher model. The student model refers to a machine learning model that has been trained to perform visual object instance segmentation using training images in which the image backgrounds have not been removed. The student model is essentially trained here to imitate the behavior of the foreground-specialized teacher model, meaning the student model is (ideally) trained to produce the same outputs that the foreground-specialized teacher model would have produced using the same images. The student model may represent any suitable machine learning model that can be trained to detect and delineate objects in images, such as a collection of neural network layers. The second training operation 208 can use any suitable technique to train the student model.

In some embodiments, the training operations 206 and 208 can be performed in a cloud-based environment, such as when the training operations 206 and 208 are performed using one or more computing devices (such as one or more servers 106) in a computing cloud. In other embodiments, the training operations 206 and 208 can be performed using at least one server 106 dedicated to training machine learning models, whether or not the at least one server 106 is part of a cloud-based environment. In general, any suitable device or devices may be used to perform the training operations 206 and 208, and there is no requirement that the same device perform both training operations 206 and 208.

The deployment stage 204 includes a deployment operation 210 in which one or more trained student models are provided to one or more external devices 212. The deployment operation 210 can include the transmission of any parameters or other suitable information defining the configuration(s) and/or operation(s) of the trained student model(s). For example, the deployment operation 210 may include the transmission of convolution neural network (CNN) or other machine learning weights or other parameters to the external device(s) 212. Any suitable communication mechanisms may be used to deploy the trained student models to the external devices 212, such as wired communications, wireless communications, or physical transport via a Universal Serial Bus (USB) Flash drive or other portable memory. In this example, the external devices 212 include a smartphone, an autonomous vehicle, and a virtual-, augmented-, or mixed-reality headset. Any of these external devices 212 may be represented by or include at least some of the components of the electronic device 101 described above. Note, however, that the external devices 212 may include any other or additional electronic device or devices configured to use at least one trained student model to perform visual object instance segmentation.

Although FIG. 2 illustrates one example of a technique 200 for supporting visual object instance segmentation using foreground-specialized model imitation, various changes may be made to FIG. 2. For example, the training operations 206 and 208 and the deployment operation 210 may occur any number of times as needed or desired. Also, a trained student model may be provided to a single external device 212 or to multiple external devices 212 of the same type or different types.

Figure 3:
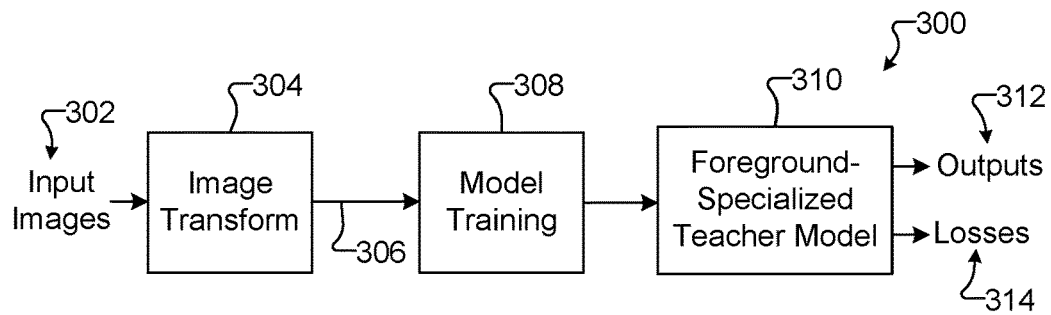
FIG. 3 illustrates an example technique for training a foreground-specialized teacher model in accordance with this disclosure.

FIG. 3 illustrates an example technique 300 for training a foreground-specialized teacher model in accordance with this disclosure. The technique 300 may, for example, represent or be performed as part of the first training operation 206 shown in FIG. 2. For ease of explanation, the technique 300 shown in FIG. 3 may be described as involving the use of the server 106 in the network configuration 100 of FIG. 1. However, the technique 300 may involve the use of any suitable devices in any suitable systems.

As shown in FIG. 3, input images 302 are received and provided to an image transform operation 304. The input images 302 represent initial training images that often contain various foreground objects to be segmented and classified and various backgrounds behind the foreground objects. The input images 302 also typically include or are associated with ground truth labels, which identify the various foreground objects to be classified, and ground truth masks, which identify the boundaries of the various foreground objects in the input images 302.

The image transform operation 304 processes the input images 302 in order to identify and remove the backgrounds in the input images 302, thereby generating foreground input images 306. The foreground input images 306 represent the input images 302 without backgrounds, meaning the foreground input images 306 contain only isolated foreground objects from the input images 302. The image transform operation 304 can use any suitable technique to remove the backgrounds from the input images 302 in order to generate the foreground input images 306. For example, as noted above, the input images 302 may be associated with ground truth masks that identify the specific boundaries of the foreground objects in the input images 302. Thus, the image transform operation 304 may generate a foreground mask for each input image 302, where the foreground mask includes a union of all ground truth masks for all foreground objects in that input image 302. All other pixels that fall outside the union of the ground truth masks may be set to zero or other value in the foreground mask in order to indicate that those pixels are associated with the background in the input image 302.

The foreground input images 306 are provided to a model training operation 308, which uses the foreground input images 306 to train a foreground-specialized teacher model 310. The model training operation 308 may use any suitable technique to train the foreground-specialized teacher model 310. For instance, a number of foreground input images 306 (which lack backgrounds) can be provided to the teacher model 310 for classification of the foreground objects. The ground truth labels that accurately identify the foreground objects in the input images 306 can be compared against the classifications generated by the teacher model 310. If incorrect classifications are generated by the teacher model 310, parameters of the teacher model 310 (such as CNN weights or other parameters) can be modified so that the teacher model 310 becomes more accurate in classifying the foreground objects in the input images 306. This process may continue until the teacher model 310 accurately (within some threshold) performs visual object instance segmentation using the foreground input images 306. Various approaches are known in the art for training a neural network or other machine learning model, and any of these approaches or later-developed approaches may be used here. The foreground-specialized teacher model 310 generates various outputs 312, which include the classifications of the foreground objects contained in the foreground input images 306. In some embodiments, the outputs 312 include softmax classification outputs of the teacher model 310.

Part of this training process for the foreground-specialized teacher model 310 typically involves minimizing one or more loss functions associated with the teacher model 310. The training here may therefore continue until one or more loss values 314 associated with the trained teacher model 310 and calculated using the one or more loss functions are each below an associated threshold. In some embodiments, multiple loss functions and multiple associated loss values 314 may be considered during the training of the foreground-specialized teacher model 310. As a particular example, the multiple loss functions may include a classification loss, a bounding box regression loss, and a mask segmentation loss. The classification loss acts as a measure of errors associated with incorrect classifications of the foreground objects in the input images 306 made by the foreground-specialized teacher model 310. The bounding box regression loss acts as a measure of errors associated with bounding boxes placed around the foreground objects in the input images 306 by the foreground-specialized teacher model 310. The mask segmentation loss acts as a measure of errors associated with boundaries of individual instances of the foreground objects in the input images 306 identified by the foreground-specialized teacher model 310. Ideally, all three losses can be minimized during the training so that the foreground-specialized teacher model 310 is able to classify different foreground objects in the input images 306 and identify their bounding boxes and boundaries with high accuracy.

The use of the image transform operation 304 here allows the foreground-specialized teacher model 310 to be trained using images in which backgrounds have been removed. This greatly simplifies training of the foreground-specialized teacher model 310 and allows the resulting trained teacher model 310 to be very powerful at the specific task for which it is trained, namely object classification. The foreground-specialized teacher model 310 here is not challenged to segment the foreground from the background in each image, nor is the foreground-specialized teacher model 310 particularly challenged to identify object masks or to regress bounding boxes. In some embodiments, this allows the foreground-specialized teacher model 310 to have a relatively small size while still being powerful enough to effectively segment and classify objects in its input images.

The foreground-specialized teacher model 310 may represent any suitable trained machine learning model that can be used for visual object instance segmentation. In some embodiments, the foreground-specialized teacher model 310 may represent a machine learning model that is based on the You Only Look At CoefficienTs (YOLACT) architecture. Of course, various machine learning models exist for instance segmentation and other image-related functions and more machine learning models are sure to be developed in the future, and this disclosure is not limited to use with any particular machine learning model.

Although FIG. 3 illustrates one example of a technique 300 for training a foreground-specialized teacher model 310, various changes may be made to FIG. 3. For example, the foreground-specialized teacher model 310 may be trained using any suitable number of input images 302 having any suitable contents. Also, the technique 300 may be performed any number of times in order to generate any number of foreground-specialized teacher models 310.

Figure 4:
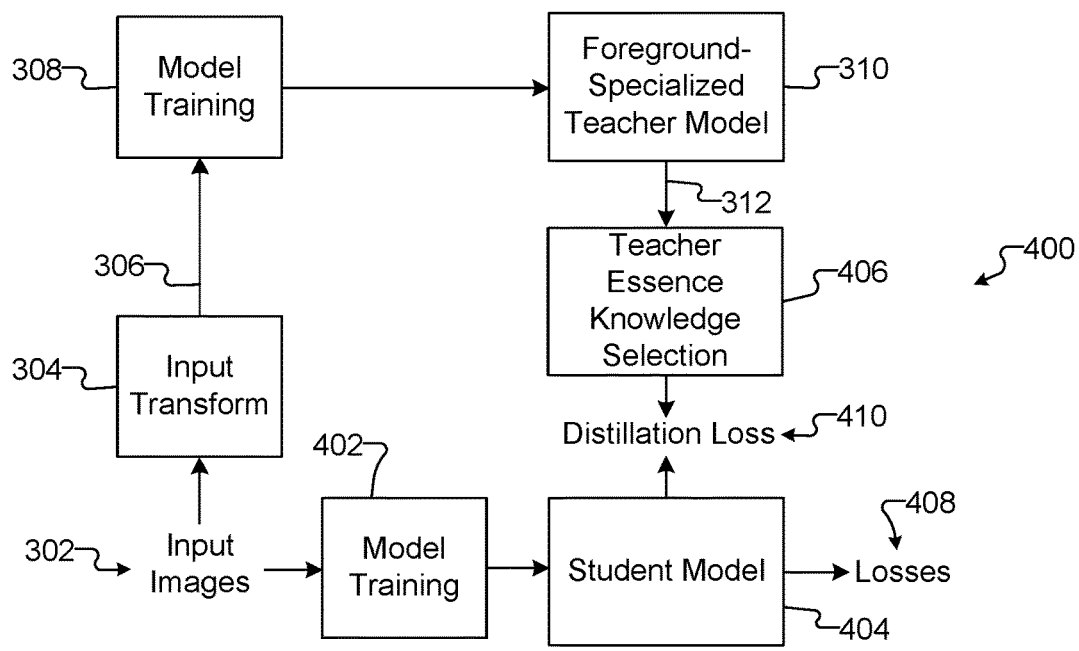
FIG. 4 illustrates an example technique for training a student model based on knowledge from a foreground-specialized teacher model in accordance with this disclosure.

FIG. 4 illustrates an example technique 400 for training a student model based on knowledge from a foreground-specialized teacher model in accordance with this disclosure. The technique 400 may, for example, represent or be performed as part of the second training operation 208 shown in FIG. 2. For ease of explanation, the technique 400 shown in FIG. 4 may be described as involving the use of the server 106 in the network configuration 100 of FIG. 1. However, the technique 400 may involve the use of any suitable devices in any suitable systems.

As shown in FIG. 4, the input images 302 are provided to the image transform operation 304, and the foreground input images 306 are used by the model training operation 308 to produce at least one foreground-specialized teacher model 310. The input images 302 are also provided to a model training operation 402, which uses the input images 302 to train at least one student model 404. Here, the model training operation 402 uses the input images 302 without transformation by the image transform operation 304, meaning the model training operation 402 uses the input images 302 with their backgrounds included.

The model training operation 402 may use any suitable technique to train the student model 404. For instance, a number of input images 302 (which include backgrounds) can be provided to the student model 404 classification of the foreground objects in the images 302. The ground truth labels that accurately identify the foreground objects in the input images 302 can be compared against the classifications generated by the student model 404. If incorrect classifications are generated by the student model 404, parameters of the student model 404 (such as CNN weights or other parameters) can be modified so that the student model 404 becomes more accurate in classifying the foreground objects in the input images 302. This process may continue until the student model 404 accurately (within some threshold) performs visual object instance segmentation using the input images 302. Various approaches are known in the art for training a neural network or other machine learning model, and any of these approaches or later-developed approaches may be used here.

Part of this training process for the student model 404 relies on knowledge obtained from the foreground-specialized teacher model 310. In this example, a teacher essence knowledge selection operation 406 receives outputs 312 from the foreground-specialized teacher model 310 and uses the outputs 312 to identify essential learned knowledge from the teacher model 310, which can then be transferred to the student model 404. The knowledge selection operation 406 therefore helps to train the student model 404 to imitate the behavior of the teacher model 310.

As noted above, the foreground-specialized teacher model 310 is trained to accurately (within some threshold) segment and classify foreground objects in images without being challenged to perform foreground-background segmentation, identify object masks, or regress bounding boxes. Because of this, the student model 404 can be trained to learn only what the teacher model 310 has been specialized for (namely object classification) so that operation and accuracy of the student model 404 can be improved or maximized. The distillation of the knowledge learned by the foreground-specialized teacher model 310 can focus on the teacher model's classification outputs and may not necessarily consider other outputs of the teacher model 310. In other words, the distillation of the knowledge learned by the foreground-specialized teacher model 310 can focus primarily or exclusively on how the teacher model 310 classifies the foreground objects in the input images 306, while little or no consideration may be given to other outputs of the teacher model 310 (such as bounding boxes or object masks). The knowledge selection operation 406 may use any suitable technique to extract learned knowledge from the foreground-specialized teacher model 310 based on outputs 312 from the teacher model 310, such as based on classification outputs of all anchor boxes, classification outputs of anchor boxes corresponding to all foreground objects, and/or the selection illustrated in the example algorithm (Algorithm 1) shown below.

In this example, part of the training process for the student model 404 also involves minimizing one or more loss functions associated with the student model 404. The training here may therefore continue until one or more loss values 408 associated with the trained student model 404 and calculated using the one or more loss functions are each below an associated threshold. In some embodiments, multiple loss functions and multiple associated loss values 408 may be considered during the training of the student model 404. As a particular example, the multiple loss functions may include a classification loss, a bounding box regression loss, and a mask segmentation loss. Ideally, all three losses can be minimized during the training so that the student model 404 is able to segment and classify different foreground objects in the input images 302 and identify their bounding boxes and boundaries with high accuracy.

Another loss function and associated loss value 410 can also be considered during the training of the student model 404. This loss function identifies a knowledge distillation loss, which represents the error between the knowledge of the student model 404 and the knowledge identified by the knowledge selection operation 406 as being important knowledge from the teacher model 310. Ideally, this loss can be minimized during the training so that the student model 404 is trained to include all essential knowledge from the teacher model 310 as determined by the knowledge selection operation 406.

One goal of the approach shown in FIG. 4 is to allow the student model 404 to obtain improved accuracy by having the student model 404 primarily or exclusively learn based on what the teacher model 310 is specialized for, namely object classification. Thus, the knowledge selection operation 406 can identify the outputs 312 of the teacher model 310 from which knowledge should be distilled. In some embodiments, the knowledge selection operation 406 uses a reciprocal anchor box selection technique to effectively learn the most critical knowledge from the teacher model 310. Some modern instance segmentation methods use anchor box-based approaches, where an "anchor box" refers to a box defined in an image being processed. In some cases, anchor boxes may represent a set of predefined bounding boxes of a certain height and width, which capture the scale and aspect ratio of specific object classes detected. Anchor boxes can be distributed over the image being processed but may not include all pixels of the image (such as when the anchor boxes are arranged in rows and columns and unboxed pixels separate the rows and columns). In some embodiments, the reciprocal anchor box selection technique used by the knowledge selection operation 406 can operate to identify both (i) anchor boxes having foreground objects correctly classified by the teacher model 310 and (ii) anchor boxes wrongly classified as foreground objects by the student model 404 but correctly classified as background by the teacher model 310. These anchor boxes may represent the most informative outputs 312 from the teacher model 310, so these outputs 312 may be the most useful in training the student model 404. This approach is summarized in the following pseudocode algorithm, which generally operates to select the anchor boxes most useful in training of the student model 404.

---

Algorithm 1: Reciprocal Anchor Box Selection

Input : $\hat{Y}_{cls}^t$ and $\hat{Y}_{cls}^s$: Predicted classification output of all anchor boxes S
        from the teacher model and the student model, respectively.
Output: $S_{recip}$: The set of selected anchor boxes for distillation.
1  begin
2    |   $S_{recip} \leftarrow \emptyset$
3    |   for i = 1 → size(S) do
4    |   |   $\hat{y}_i^t = \hat{Y}_{cls}^t$.get(i); $t_{cls} = \text{argmax}(\hat{y}_i^t)$ ; // teacher prediction
5    |   |   $\hat{y}_i^s = \hat{Y}_{cls}^s$.get(i); $s_{cls} = \text{argmax}(\hat{y}_i^s)$ ; // student prediction
6    |   |   if $t_{cls} = gt_i$ and ($t_{cls} > 0$ or $s_{cls} > 0$) ; // 0 represents background
7    |   |   then
8    |   |      $\lfloor S_{recip}$.insert(i)

---

Although FIG. 4 illustrates one example of a technique 400 for training a student model 404 based on knowledge from a foreground-specialized teacher model 310, various changes may be made to FIG. 4. For example, the student model 404 may be trained using any suitable number of input images 302 having any suitable contents. Also, the technique 400 may be performed any number of times to generate any number of student models 404.

The approaches described above for training the foreground-specialized teacher model 310 and the student model 404 may be expanded in various ways depending on the implementation. For example, in some instances, the training of the student model 404 can incorporate a consideration of foreground awareness. That is, the foreground-specialized teacher model 310 is trained to segment and classify foreground objects with no background interference (since the foreground-specialized teacher model 310 is trained using the foreground input images 306). To more accurately imitate the behavior of the foreground-specialized teacher model 310, the student model 404 can be trained to embed foreground-aware features into the learned features (such as features extracted from hidden layers of a convolutional neural network) of the student model 404. In other words, the student model 404 can be trained to identify (at least approximately) which regions in the input images 302 are background regions and which regions in the input images 302 are foreground regions. There are various ways in which this can be accomplished, and the following provides two example approaches (although other approaches may be used). In a first approach, the student model 404 is trained to perform a foreground segmentation task in addition to the object classification task, which may be achieved in some embodiments by adding a branch for the foreground segmentation task to the student model's backbone. In a second approach, a learned latent soft foreground mask is applied to the student model's intermediate convolution features.

Figure 5:
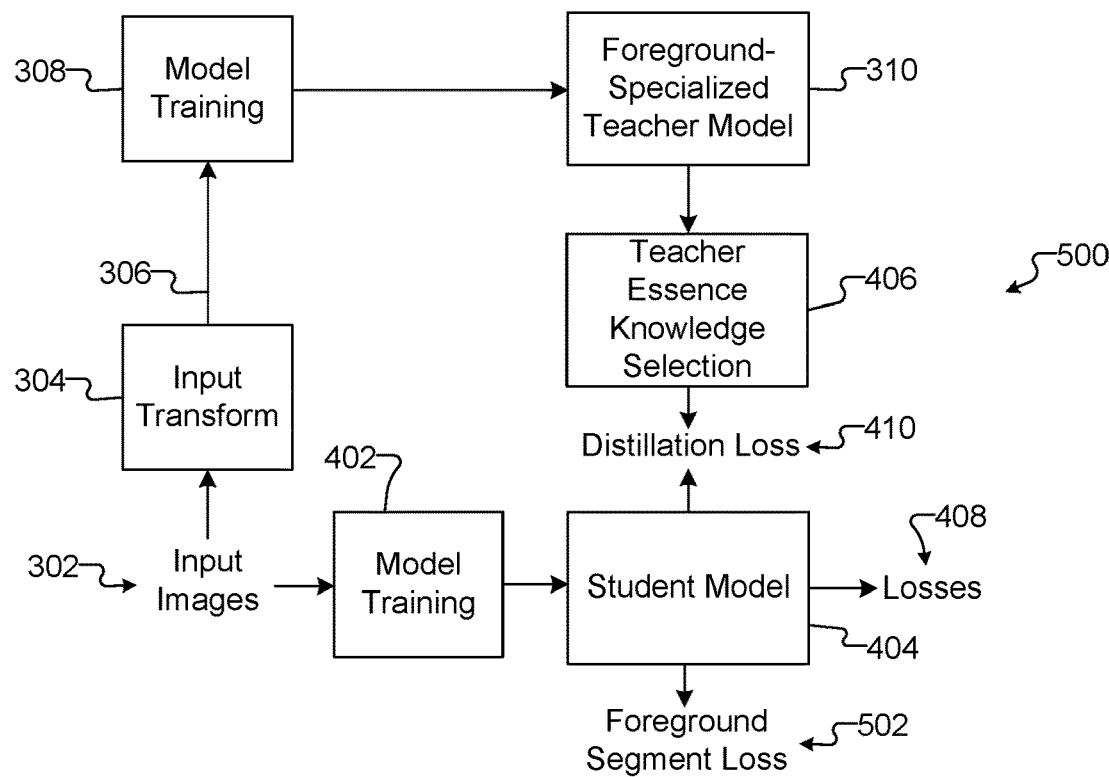
FIGS. 5 and 6 illustrate an example technique for incorporating foreground awareness into the training of a student model in accordance with this disclosure.
Figure 6:
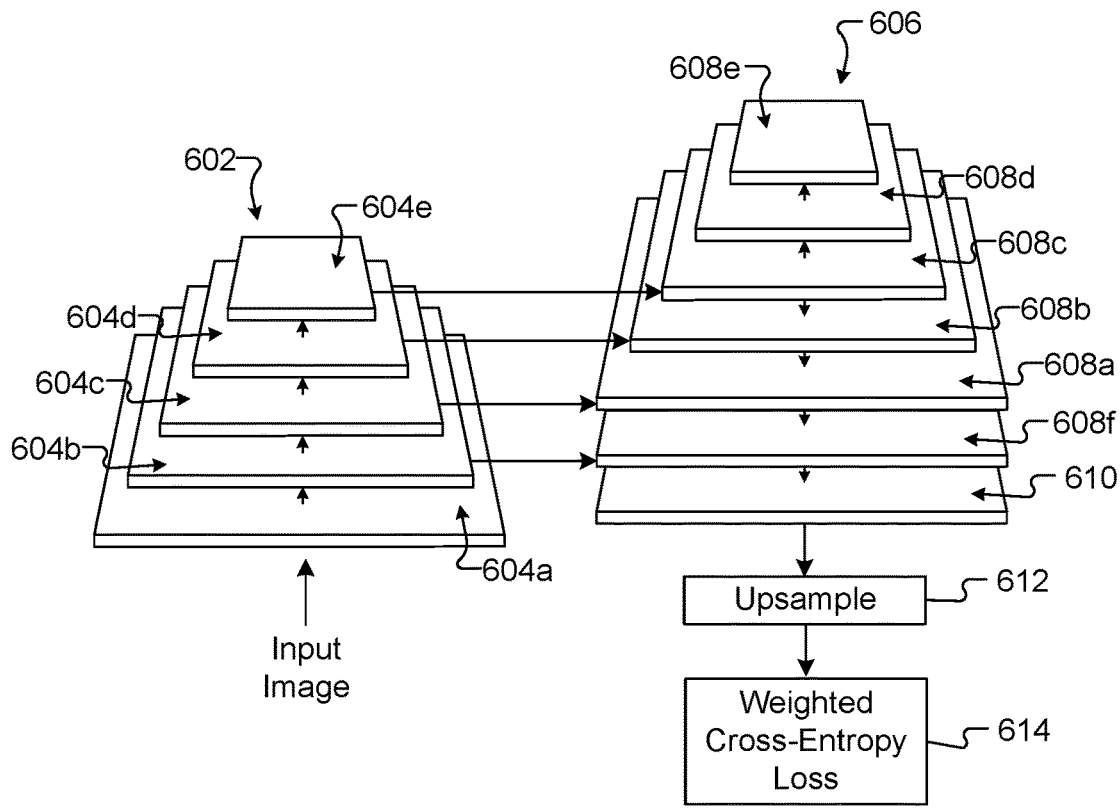

FIGS. 5 and 6 illustrate an example technique 500 for incorporating foreground awareness into the training of a student model in accordance with this disclosure. The technique 500 may, for example, represent or be performed as part of the second training operation 208 shown in FIG. 2. For ease of explanation, the technique 500 shown in FIGS. 5 and 6 may be described as involving the use of the server 106 in the network configuration 100 of FIG. 1. However, the technique 500 may involve the use of any suitable devices in any suitable systems.

As shown in FIG. 5, the technique 500 is similar to the technique 400 described above. However, an additional loss function and associated loss value 502 are also considered during the training of the student model 404. This loss function identifies a binary foreground segmentation loss, which represents the error between the actual foreground/background regions in the input images 302 and the foreground/background regions identified by the student model 404, with the addition of a branch for the foreground segmentation task. Ideally, this loss can be minimized during the training so that the student model 404 is trained to accurately (within some threshold) distinguish foreground and background regions.

As shown in FIG. 6, part of an example architecture for the student model 404 is illustrated, where the architecture supports consideration of foreground awareness. In FIG. 6, an input image is received by a network 602 of convolutional layers 604a-604e. Each convolutional layer 604a-604e applies a convolution function to its inputs in order to generate its outputs. The convolutional layer 604a applies a convolution operation to the input image, while the convolutional layers 604b-604e apply convolution operations to the outputs of the prior convolutional layers 604a-604d, respectively. Each convolutional layer 604a-604e generally represents a layer of convolutional neurons, which apply a convolution function that emulates the response of individual neurons to visual stimuli. Each neuron typically applies some function to its input values (often by weighting different input values differently) to generate output values. A convolutional layer 604a-604e may be associated with an activation function, which can apply a specific function or operation to the output values from the neurons to produce final outputs of the convolutional layer. The output of each convolutional layer 604a-604e has a lower resolution than its input. The network 602 of convolutional layers 604a-604e is generally said to represent a "feature backbone" of the student model 404 since the network 602 of convolutional layers 604a-604e generates collections of encoded features representing the input image.

Outputs from the convolutional layers 604c-604e are provided to a feature pyramid network 606, which includes various layers 608a-608e. Each of the layers 608a-608e may apply a mask or other machine learning operation to its inputs in order to identify possible objects that are contained in the input image. Each layer 608a-608e in the feature pyramid network 606 can be used to detect objects at a different image scale. Outputs generated by the various layers 608a-608e in the feature pyramid network 606 can be further processed by other components of the architecture (shown in FIG. 9) to perform visual object instance segmentation. In other embodiments, various combinations of outputs from the convolutional layers 604a-604e (such as from the layers 604a-604e, 604a-604d, 604b and 604e, etc.) may be provided to the feature pyramid network 606.

An additional layer 608f is included in the feature pyramid network 606 to identify objects in the input image based on the outputs from one or more convolutional layers 604a-604e of the network 602, such as from the convolutional layer 604b. A convolution layer 610 applies a convolution function (such as 1×1 convolution function) to outputs of the layer 608f. An upsampling operation 612 performs upsampling of outputs of the convolution layer 610 so that the outputs of the convolution layer 610 have a higher resolution. The upsampled outputs from the upsampling operation 612 are provided to a loss calculation operation 614, which calculates a weighted pixel-wise binary cross-entropy loss value (which represents a specific type of loss value 502) based on the upsampled outputs from the upsampling operation 612.

Overall, the layers 608f, 610 and operations 612, 614 form a binary segmentation branch in the student model 404. The binary segmentation branch generally operates to segment the input image into foreground and background regions. The weighted pixel-wise binary cross-entropy loss places a higher weight on foreground pixels so that the foreground regions receive more attention in the feature learning during the training of the student model 404. Note that the layers 608f, 610 and operations 612, 614 may be used during training of the student model 404 but may not be needed during inferencing after the student model 404 is placed into actual use. Thus, the incorporation of the foreground awareness into the student model 404 may have little or no effect on the student model's inferencing speed during use, but its use during training can effectively increase the student model's accuracy.

Note that in FIG. 6, the layer 608a receives inputs from the layers 604c and 608b, the layer 608b receives inputs from the layers 604d and 608c, and the layer 608f receives inputs from the layers 604b and 608a. Although not shown in detail here, the two inputs to each layer 608a, 608b, or 608f can be combined in any suitable manner prior to use by that layer 608a, 608b, or 608f. For example, in some embodiments, the two inputs to each layer 608a, 608b, or 608f can be combined by applying a 1×1 convolution operation to the inputs received from the layer 604c, 604d, or 604b, applying a 2× upsampling to the inputs received from the layer 608b, 608c, or 608a, and combining the results.

Figure 7:
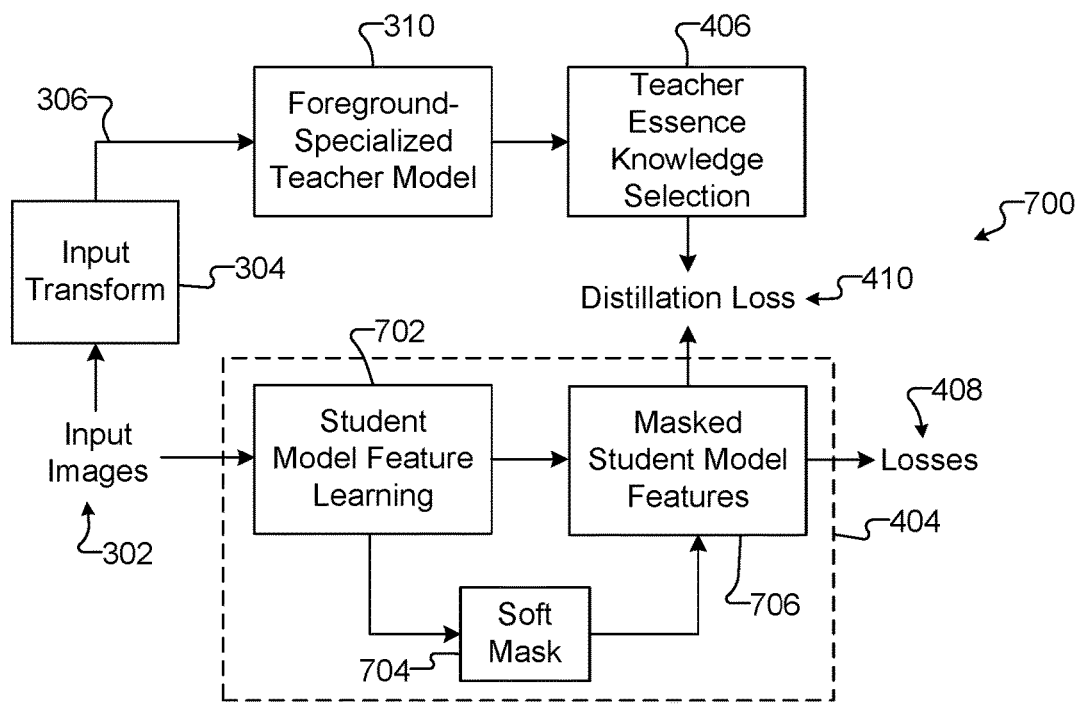
FIGS. 7 and 8 illustrate another example technique for incorporating foreground awareness into the training of a student model in accordance with this disclosure.
Figure 8:
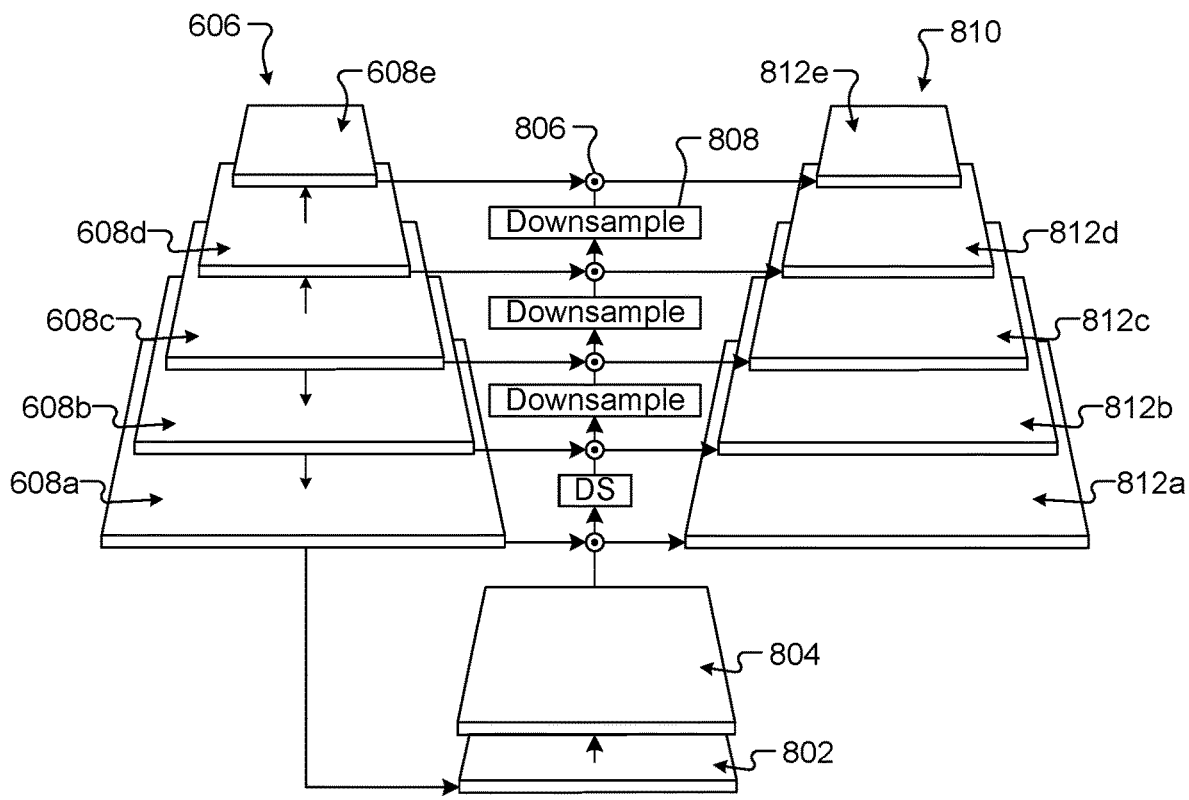

FIGS. 7 and 8 illustrate another example technique 700 for incorporating foreground awareness into the training of a student model in accordance with this disclosure. The technique 700 may, for example, represent or be performed as part of the second training operation 208 shown in FIG. 2. For ease of explanation, the technique 700 shown in FIGS. 7 and 8 may be described as involving the use of the server 106 in the network configuration 100 of FIG. 1. However, the technique 700 may involve the use of any suitable devices in any suitable systems.

As shown in FIG. 7, the technique 700 is similar to the technique 400 described above (note that the model training operations are omitted here for simplicity of illustration). In this example, the student model 404 is associated with feature learning 702, which represents the training of the student model 404 as discussed above. In addition, the student model 404 is associated with a soft mask 704, which represents a latent soft feature mask that is applied to the learned features in order to embed foreground awareness into the student model 404. The soft mask 704 can adaptively calibrate the pixel-wise feature responses of the student model 404 based on guidance from the teacher model 310.

As shown in FIG. 8, part of an example architecture for the student model 404 is illustrated, where the architecture supports consideration of foreground awareness. In FIG. 8, the feature pyramid network 606 is shown, and the feature pyramid network 606 may receive inputs from the network 602 of convolutional layers 604a-604e as discussed above. The layers 608f, 610 and operations 612, 614 are omitted in FIG. 8 and not used here. Instead, the outputs of the layer 608a of the feature pyramid network 606 are provided to a convolutional layer 802, which applies a convolution function (such as 3×3 convolution function) to the outputs of the layer 608a. The convolutional layer 802 is generally trained to distinguish between foreground and background regions in images. Outputs of the convolutional layer 802 are provided to a sigmoid function layer 804. The sigmoid function layer 804 applies a sigmoid function to the outputs of the convolutional layer 802, where the sigmoid function generally represents a type of S-shaped curve. The sigmoid function layer 804 thereby helps to convert the outputs of the convolutional layer 802 (which distinguish between foreground and background regions in images) into a set of values between known minimum and maximum values (such as between ±1).

Outputs from the layers 608a-608e of the feature pyramid network 606 are also combined with other information using multiplication operations 806. Here, each of multiple downsampling (DS) operations 808 performs downsampling of the outputs from the sigmoid function layer 804 or the outputs from a prior multiplication operation 806, and the downsampled information is provided to a subsequent multiplication operation 806 for use. The multiplication operations 806 therefore apply a mask that is generated by the convolutional layer 802 and the sigmoid function layer 804 (or a downsampled version of the mask) to the outputs of the feature pyramid network 606. The results of these operations form a collection 810 of masked feature pyramid network outputs in various layers 812a-812e. The masked feature pyramid network outputs can be further processed by other components of the architecture (shown in FIG. 9) to perform visual object instance segmentation.

Figure 9:
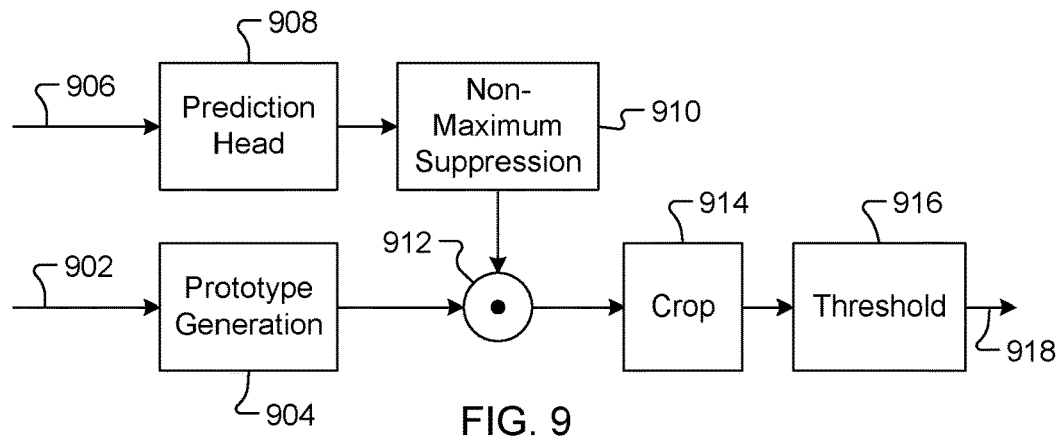
FIG. 9 illustrates additional operations for supporting visual object instance segmentation using foreground-specialized model imitation in accordance with this disclosure.

FIG. 9 illustrates additional operations for supporting visual object instance segmentation using foreground-specialized model imitation in accordance with this disclosure. In particular, FIG. 9 illustrates additional operations that may be performed in an architecture based on the outputs of the layers 608a-608e in FIG. 6 or based on the outputs of the layers 812a-812e in FIG. 8.

As shown in FIG. 9, inputs 902 are provided to a prototype generation operation 904. The inputs 902 here may represent the outputs from the layer 608a in FIG. 6 or the outputs from the layer 812a in FIG. 8. The prototype generation operation 904 uses the inputs 902 to make initial predictions as to which portion(s) of the image being processed may correspond to one or more objects in the image. For example, if the image being processed includes a tennis player holding a tennis racket, the prototype generation operation 904 may generate masks identifying the tennis player and the tennis racket as different objects to be identified. The prototype generation operation 904 may use any suitable technique to identify the presence of one or more objects in an image. Various approaches for identifying prototypes for object detection in images are known in the art, and additional approaches are sure to be developed in the future.

Inputs 906 are also provided to a prediction head operation 908. The inputs 906 here may represent the collection of outputs from the layers 608a-608e in FIG. 6 or the collection of outputs from the layers 812a-812e in FIG. 8. The prediction head operation 908 uses the inputs 906 to make initial predictions of the type(s) of object(s) that may be present in the foreground of the image being processed. Various approaches for identifying the types of objects present in images are known in the art, and additional approaches are sure to be developed in the future. Outputs of the prediction head operation 908 are provided with a non-maximum suppression (NMS) operation 910, which helps identify situations in which multiple objects overlap in the image being processed.

The outputs of the prototype generation operation 904 and the non-maximum suppression operation 910 are combined using a multiplication operation 912, which produces one or more masks identifying the associated portion(s) of the image being processed for one or more objects. A crop operation 914 can be used to crop the image data for each identified object, and a threshold operation 916 can be used to apply a threshold to the cropped image data in order to identify a specific boundary for each identified object in the image. The resulting output 918 can include the original image being processed, along with (i) a bounding box around each identified object, (ii) a precise boundary of each identified object, and (iii) a label identifying the type of each object identified in the image. Again, various approaches for identifying these outputs are known in the art (such as in the YOLACT architecture), and additional approaches are sure to be developed in the future.

Although FIGS. 5, 6, 7, 8, and 9 illustrate examples of techniques for incorporating foreground awareness into the training of a student model and additional operations for supporting visual object instance segmentation using foreground-specialized model imitation, various changes may be made to these figures. For example, any other suitable technique may be used to incorporate foreground awareness into the training of a student model, or the incorporation of foreground awareness into the training of a student model may be omitted. Also, the operations shown in FIG. 9 are merely meant to illustrate the types of operations that may be used to perform visual object instance segmentation, but other operations may also be used to perform visual object instance segmentation.

Note that various loss functions have been described above in conjunction with the training of a machine learning model. These loss functions included a knowledge distillation loss function and a binary foreground segmentation loss function. In some embodiments, the knowledge distillation loss function may represent a soft version of cross-entropy loss between temperature (T)-controlled softmax classification outputs 312 of the teacher model 310 and the student model 404 on the set of selected anchor boxes $S_{recip}$ as illustrated in Algorithm 1. In particular embodiments, the knowledge distillation loss function may be expressed as follows:

$$L_{distill} = \frac{1}{|S_{recip}|} \sum_{i \in S_{recip}} KL_{div}\left(softmax\left(\frac{\hat{y}_i^t}{T}\right), softmax\left(\frac{\hat{y}_i^s}{T}\right)\right)$$

Here, $KL_{div}$ represents a measure of Kullback-Leibler divergence, meaning it represents a measure of how one probability distribution differs from another probability distribution. Also, in some embodiments, the binary foreground segmentation loss function may represent a weighted pixel-wise binary cross-entropy loss. In particular embodiments, the weight between foreground and background pixels may be set as 2:1, although other suitable weights may be used. In addition, in some embodiments, the training of the student model 404 may attempt to minimize a total loss defined as follows:

$$L_{other} + \lambda_1 L_{distill} + \lambda_2 L_{fseg}$$

Here, $L_{other}$ refers to the other losses associated with the student model 404 (such as classification loss, bounding box regression loss, and mask segmentation loss), $L_{distill}$ refers to the knowledge distillation loss, and $L_{fseg}$ refers to the binary foreground segmentation loss. Also, $\lambda_1$ and $\lambda_2$ represent hyper-parameters used to balance the loss terms and can be set to suitable values as needed or desired.

Figure 10:
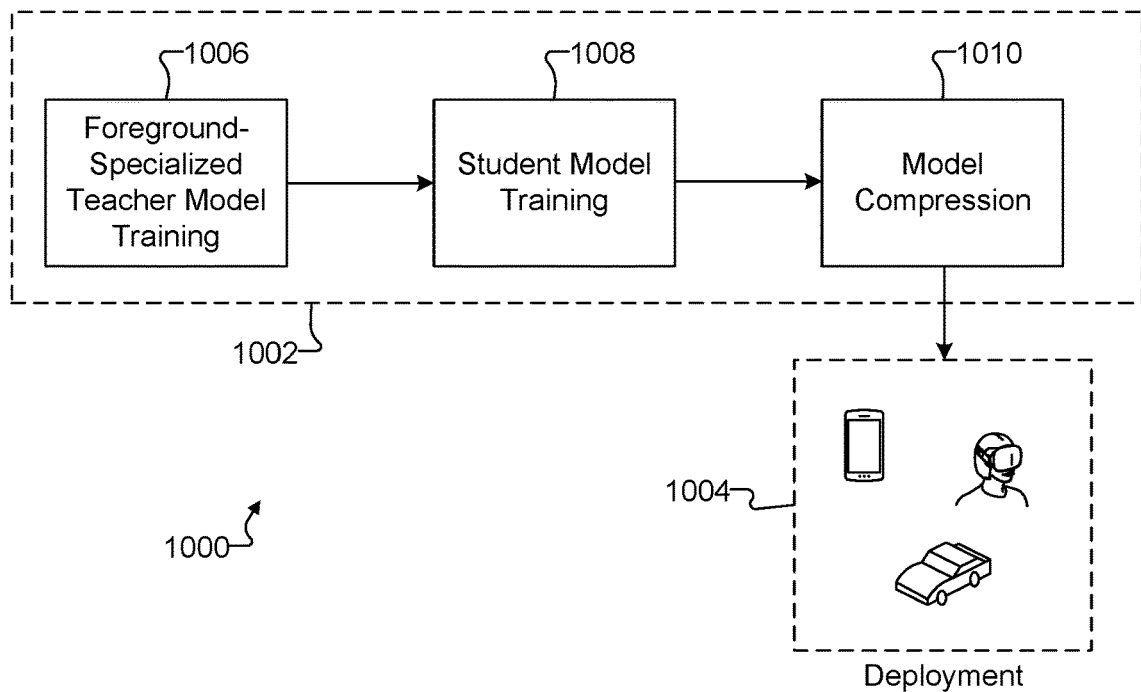
FIG. 10 illustrates another example technique for supporting visual object instance segmentation using foreground-specialized model imitation in accordance with this disclosure.

FIG. 10 illustrates another example technique 1000 for supporting visual object instance segmentation using foreground-specialized model imitation in accordance with this disclosure. For ease of explanation, the technique 1000 shown in FIG. 10 may be described as involving the use of the server 106 and the electronic device 101 in the network configuration 100 of FIG. 1. However, the technique 1000 may involve the use of any suitable devices in any suitable systems.

As shown in FIG. 10, the technique 1000 is similar to the technique 200 described above. For example, the technique 1000 includes a training stage 1002 and a deployment stage 1004, and the training stage 1002 includes a first training operation 1006 and a second training operation 1008. These operations may be the same as or similar to the corresponding operations in FIG. 2.

The training stage 1002 here further includes a model compression operation 1010, which is used to compress one or more student models generated by the second training operation 1008 prior to deployment. The compression of a student model may allow the student model to be made smaller and/or to provide faster inferencing times. This may be necessary or desirable in various circumstances, such as when used with mobile devices or edge devices that may be resource-constrained. The compression operation 1010 may use any suitable technique to compress a student model, such as model pruning. Note that the compression operation 1010 may also provide different types or levels of compression to one or more student models based on, for instance, the external device to receive each compressed student model.

Although FIG. 10 illustrates another example of a technique 1000 for supporting visual object instance segmentation using foreground-specialized model imitation, various changes may be made to FIG. 10. For example, each of the operations in FIG. 10 may occur any number of times as needed or desired. Also, a trained student model may be provided to a single external device or to multiple external devices of the same type or different types.

Figure 11:
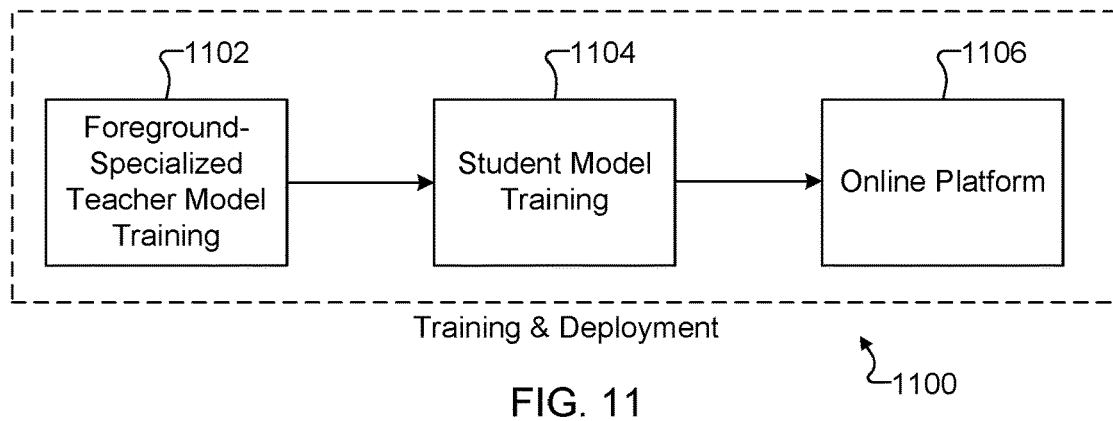
FIG. 11 illustrates yet another example technique for supporting visual object instance segmentation using foreground-specialized model imitation in accordance with this disclosure.

FIG. 11 illustrates yet another example technique 1100 for supporting visual object instance segmentation using foreground-specialized model imitation in accordance with this disclosure. For ease of explanation, the technique 1100 shown in FIG. 11 may be described as involving the use of the server 106 and the electronic device 101 in the network configuration 100 of FIG. 1. However, the technique 1100 may involve the use of any suitable devices in any suitable systems.

As shown in FIG. 11, the technique 1100 is similar to the technique 200 described above. For example, the technique 1100 includes a first training operation 1102 and a second training operation 1104, which may be used to train a student model. However, the deployment of the trained student model here involves providing the trained student model to an online platform 1106. The online platform 1106 may represent a server, a cloud-based hosting environment, or other device or system in which memory and processing resources are more abundant (at least relative to the external devices 212 described above).

In this example, because the platform 1106 has access to more resources, there may be little or no need to have a smaller student model trained by the training operation 1104. As a result, there may also be little or no need to have a foreground-specialized teacher model with a similarly-smaller size as the student model. Because of this, the foreground-specialized teacher model that is trained by the first training operation 1102 may be large, and the student model that is trained by the second training operation 1104 may also be large. The approaches described above can still be used to train the student model to more effectively imitate the behavior of the foreground-specialized teacher model.

Although FIG. 11 illustrates yet another example of a technique 1100 for supporting visual object instance segmentation using foreground-specialized model imitation, various changes may be made to FIG. 11. For example, each of the operations in FIG. 11 may occur any number of times as needed or desired. Also, a trained student model may be provided to a single external device or to multiple external devices of the same type or different types. In addition, while not shown here, any suitable combination of operations from the various techniques 200, 1000, 1100 described above may be used. For instance, the model compression operation 1010 may be used in the technique 1100.

Note that the functionality described above may be used in any suitable system to support any suitable functionality in that system. For example, trained student models may be provided to robotics systems for use in localizing and identifying objects around robots or robotic assemblies. This may allow the robots or robotic assemblies to pick up or manipulate objects more effectively. As another example, trained student models may be provided to autonomous vehicles for use in localizing and identifying objects around the vehicles. This may allow the autonomous vehicles to identify nearby objects more effectively, which can help the autonomous vehicles to make better or more informed decisions in controlling the operations of the vehicles. As yet another example, trained student models may be provided to augmented- or mixed-reality devices for use in identifying objects within images. This may allow the augmented- or mixed-reality devices to more effectively insert virtual objects or virtual effects into the images. As a particular example, an application on a mobile device or other device may be used to insert a piece of furniture into one or more images of a room or other area, and this may involve the identification and localization of other objects already in the room or other area. As another particular example, an application on a mobile device or other device may be used to identify the head, hands, or other exposed portions of a person and his or her clothing in at least one image so that the clothing of the person can be changed electronically, and this may involve the identification and localization of the different exposed portions of the person's body. Of course, this functionality may be used in any other suitable manner. In addition, it should be noted that the functionality described above may be used with still images or video images.

Figure 12:
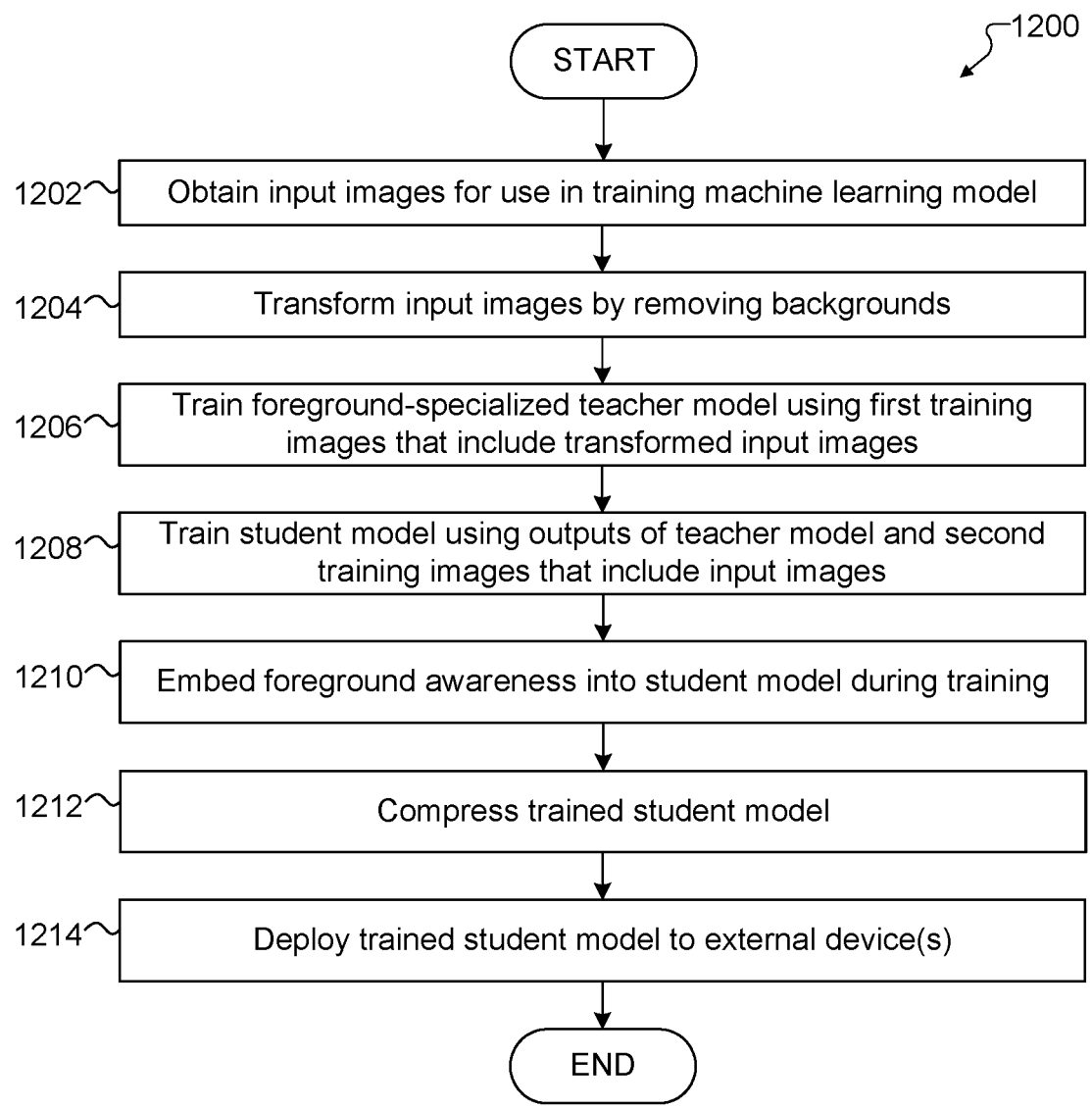
FIG. 12 illustrates an example method for visual object instance segmentation using foreground-specialized model imitation in accordance with this disclosure.

FIG. 12 illustrates an example method 1200 for visual object instance segmentation using foreground-specialized model imitation in accordance with this disclosure. For ease of explanation, the method 1200 shown in FIG. 12 may be described as involving the use of the server 106 and the electronic device 101 in the network configuration 100 of FIG. 1. However, the method 1200 may involve the use of any suitable devices in any suitable systems.

As shown in FIG. 12, input images for use in training machine learning models are obtained at step 1202. This may include, for example, the server 106 obtaining input images 302 containing various objects in foregrounds of the input images 302. This may also include the server 106 obtaining ground truth labels that identify the various foreground objects in the input images 302 and ground truth masks that identify the specific boundaries of the various foreground objects in the input images 302. The input images are transformed by removing their backgrounds at step 1204. This may include, for example, the server 106 performing the image transform operation 304 to remove the backgrounds from the input images 302 and generate the foreground input images 306. As a particular example, this may include the server 106 setting all pixels outside the boundaries of the objects in the input images 302 (as defined by the ground truth masks) to zero in the foreground input images 306.

At least one foreground-specialized teacher model is trained using first training images, where the first training images include the transformed input images, at step 1206. This may include, for example, the server 106 performing the model training operation 308 to train at least one teacher model 310 using the foreground input images 306. Among other things, this trains the at least one teacher model 310 to classify objects in the foreground input images 306 with high accuracy without focusing on performing various other tasks typically associated with visual object instance segmentation, such as foreground-background segmentation.

At least one student model is trained using outputs of the trained teacher model(s) and second training images, where the second training images include the input images, at step 1208. This may include, for example, the server 106 performing the model training operation 402 to train at least one student model 404 using the input images 302 and various outputs 312 of the trained teacher model(s) 310. This may also include the server 106 performing the knowledge selection operation 406 in order to select which outputs 312 of the trained teacher model(s) 310 to use in training the student model(s) 404. Among other things, this trains the at least one student model 404 to imitate the behavior of the at least one teacher model 310, thereby training the at least one student model 404 to segment and classify objects in the input images 302 with high accuracy. As part of this training process, foreground awareness may optionally be embedded into the student model(s) during the training at step 1210. This may include, for example, the server 106 training the layers 608f, 610 or the layers 802, 804 of the student model 404 to distinguish between foreground and background regions of the input images 302. The trained student model(s) may optionally be compressed at step 1212. This may include, for example, the server 106 performing the model compression operation 1010 to compress each trained student model 404.

The trained student model(s) can be deployed to one or more external devices at step 1214. This may include, for example, the server 106 performing the deployment operation 210 to provide the one or more trained student models 404 to one or more destinations, such as the electronic device 101. As particular examples, the one or more destinations may include one or more end-user devices that are typically resource-constrained, such as one or more external devices 212 like a smartphone, an autonomous vehicle, and a virtual-, augmented-, or mixed-reality headset. As other particular examples, the one or more destinations may also or alternatively include one or more online platforms 1106 or other devices that are not typically resource-constrained (at least relative to the external devices 212).

Although FIG. 12 illustrates one example of a method 1200 for visual object instance segmentation using foreground-specialized model imitation, various changes may be made to FIG. 12. For example, while shown as a series of steps, various steps in FIG. 12 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
   training, using at least one processor, a specialized teacher model to perform visual object instance segmentation in order to segment and classify objects in first training images, the first training images containing foreground objects without backgrounds;
   training, using the at least one processor, a student model to perform visual object instance segmentation in order to segment and classify objects in second training images, the second training images containing the foreground objects and the backgrounds, wherein training the student model comprises using selected outputs of the specialized teacher model; and
   deploying the trained student model to perform visual object instance segmentation in an external device;
   wherein the selected outputs of the specialized teacher model comprise classification outputs;
   wherein training the specialized teacher model comprises minimizing at least one first loss function using the first training images; and
   wherein training the student model comprises:
      using the classification outputs of the specialized teacher model as soft labels to extract knowledge from the specialized teacher model; and
      minimizing at least one second loss function based on the classification outputs of the specialized teacher model and outputs of the student model.

2. The method of claim 1, further comprising:
   applying an image transform to input images in order to generate the first training images, the second training images comprising the input images, the image transform isolating foreground objects in the input images and removing backgrounds from the input images.

3. The method of claim 1, wherein:
   the at least one first loss function comprises multiple loss functions, the multiple loss functions including a classification loss, a bounding box regression loss, and a mask segmentation loss; and
   the at least one second loss function comprises a binary foreground segmentation loss.

4. The method of claim 1, further comprising:
   embedding foreground-awareness features in learned features of the student model, the foreground-awareness features allowing the student model to focus on segmenting and classifying the foreground objects in the second training images while ignoring the backgrounds in the second training images.

5. The method of claim 4, wherein embedding the foreground-awareness features in the learned features of the student model comprises using a binary segmentation branch or a soft feature mask in the student model.

6. The method of claim 1, further comprising:
   compressing the trained student model prior to deploying the trained student model to the external device.

7. The method of claim 1, wherein a size or a capacity of the specialized teacher model matches a size or a capacity of the trained student model.

8. The method of claim 1, wherein the external device comprises an edge or mobile device.

9. An electronic device comprising:
   at least one processor configured to:
      train a specialized teacher model to perform visual object instance segmentation in order to segment and classify objects in first training images, the first training images containing foreground objects without backgrounds;
      train, using selected outputs of the specialized teacher model, a student model to perform visual object instance segmentation in order to segment and classify objects in second training images, the second training images containing the foreground objects and the backgrounds; and
      deploy the trained student model to perform visual object instance segmentation in an external device;
   wherein the selected outputs of the specialized teacher model comprise classification outputs;
   wherein, to train the specialized teacher model, the at least one processor is configured to minimize at least one first loss function using the first training images; and
   wherein, to train the student model, the at least one processor is configured to:
      use the classification outputs of the specialized teacher model as soft labels to extract knowledge from the specialized teacher model; and
      minimize at least one second loss function based on the classification outputs of the specialized teacher model and outputs of the student model.

10. The electronic device of claim 9, wherein:
    the at least one processor is further configured to apply an image transform to input images to isolate foreground objects in the input images and remove backgrounds from the input images in order to generate the first training images; and
    the second training images comprise the input images.

11. The electronic device of claim 9, wherein:
    the at least one first loss function comprises multiple loss functions, the multiple loss functions including a classification loss, a bounding box regression loss, and a mask segmentation loss; and
    the at least one second loss function comprises a binary foreground segmentation loss.

12. The electronic device of claim 9, wherein the at least one processor is further configured to embed foreground-awareness features in learned features of the student model, the foreground-awareness features allowing the student model to focus on segmenting and classifying the foreground objects in the second training images while ignoring the backgrounds in the second training images.

13. The electronic device of claim 12, wherein, to embed the foreground-awareness features in the learned features of the student model, the at least one processor is configured to use a binary segmentation branch or a soft feature mask in the student model.

14. The electronic device of claim 9, wherein the at least one processor is further configured to compress the trained student model prior to deploying the trained student model to the external device.

15. The electronic device of claim 9, wherein the selected outputs of the specialized teacher model are associated with:
   anchor boxes having foreground objects correctly classified by the specialized teacher model; and
   anchor boxes wrongly classified as foreground objects by the student model but correctly classified as background by the specialized teacher model.

16. A non-transitory computer readable medium containing instructions that when executed cause at least one processor to:
   train a specialized teacher model to perform visual object instance segmentation in order to segment and classify objects in first training images, the first training images containing foreground objects without backgrounds;
   train, using selected outputs of the specialized teacher model, a student model to perform visual object instance segmentation in order to segment and classify objects in second training images, the second training images containing the foreground objects and the backgrounds; and
   deploy the trained student model to perform visual object instance segmentation in an external device;
   wherein the selected outputs of the specialized teacher model comprise classification outputs;
   wherein the instructions that when executed cause the at least one processor to train the specialized teacher model comprise instructions that when executed cause the at least one processor to minimize at least one first loss function using the first training images; and
   wherein the instructions that when executed cause the at least one processor to train the student model comprise instructions that when executed cause the at least one processor to:
      use the classification outputs of the specialized teacher model as soft labels to extract knowledge from the specialized teacher model; and
      minimize at least one second loss function based on the classification outputs of the specialized teacher model and outputs of the student model.

17. The non-transitory computer readable medium of claim 16, further containing instructions that when executed cause the at least one processor to apply an image transform to input images to isolate foreground objects in the input images and remove backgrounds from the input images in order to generate the first training images;
   wherein the second training images comprise the input images.

18. The non-transitory computer readable medium of claim 16, wherein:
   the at least one first loss function comprises multiple loss functions, the multiple loss functions including a classification loss, a bounding box regression loss, and a mask segmentation loss; and
   the at least one second loss function comprises a binary foreground segmentation loss.

19. The non-transitory computer readable medium of claim 16, further containing instructions that when executed cause the at least one processor to embed foreground-awareness features in learned features of the student model, the foreground-awareness features allowing the student model to focus on segmenting and classifying the foreground objects in the second training images while ignoring the backgrounds in the second training images.

20. The non-transitory computer readable medium of claim 16, further containing instructions that when executed cause the at least one processor to compress the trained student model prior to deploying the trained student model to the external device.

* * * * *